(12) United States Patent
Yeager et al.

(10) Patent No.: US 9,279,350 B2
(45) Date of Patent: Mar. 8, 2016

(54) INTAKE VALVE CLOSURE CONTROL FOR DUAL-FUEL ENGINES

(71) Applicant: Caterpillar Inc., Peoria, IL (US)

(72) Inventors: Kendall D. Yeager, Peoria, IL (US);
Kevin J. Schreader, East Peoria, IL (US); Victor I. Yacoub, Washington, IL (US); Edwin Henry Langewisch, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/287,909

(22) Filed: May 27, 2014

(65) Prior Publication Data

US 2015/0345347 A1    Dec. 3, 2015

(51) Int. Cl.
*F01L 9/02* (2006.01)
*F01L 1/24* (2006.01)
*F01L 1/34* (2006.01)

(52) U.S. Cl.
CPC ... *F01L 9/02* (2013.01); *F01L 1/24* (2013.01); *F01L 1/34* (2013.01)

(58) Field of Classification Search
CPC .................. F01L 9/02; F01L 1/24; F01L 1/34
USPC ...................................................... 123/90.12
See application file for complete search history.

(56) References Cited

U.S. PATENT DOCUMENTS

| | | | |
|---|---|---|---|
| 2,602,434 A | 7/1952 | Barnaby | |
| 5,127,375 A * | 7/1992 | Bowman et al. | 123/90.12 |
| 5,377,654 A | 1/1995 | LoRusso et al. | |
| 6,152,104 A | 11/2000 | Vorih et al. | |
| 6,237,551 B1 | 5/2001 | Macor et al. | |
| 6,244,257 B1 | 6/2001 | Hu | |
| 6,321,701 B1 | 11/2001 | Vorih et al. | |
| 6,415,752 B1 * | 7/2002 | Janak | 123/90.12 |
| 6,647,954 B2 | 11/2003 | Yang et al. | |
| 6,701,888 B2 | 3/2004 | Houtz | |
| 6,718,945 B2 * | 4/2004 | Doria et al. | 123/432 |
| 7,007,644 B2 | 3/2006 | Tai et al. | |
| 7,117,831 B2 | 10/2006 | Methley | |
| 7,162,996 B2 | 1/2007 | Yang | |
| 7,213,553 B2 | 5/2007 | Kalish et al. | |
| 7,559,300 B2 | 7/2009 | Ruggiero | |
| 7,665,433 B2 | 2/2010 | Sugihara | |
| 8,069,828 B2 * | 12/2011 | de Ojeda et al. | 123/90.12 |
| 8,375,904 B2 | 2/2013 | Gustafson | |

(Continued)

*Primary Examiner* — Zelalem Eshete
(74) *Attorney, Agent, or Firm* — Miller, Matthias & Hull LLP

(57) ABSTRACT

A system and a method for actuating intake valves of an internal combustion engine. The system includes a hydraulic circuit including a master cylinder, a control valve, an accumulator, a first one-way valve and a slave cylinder. The slave cylinder accommodates a slave piston, which is coupled to the intake valves. The control valve is disposed upstream of the accumulator for controlling flow from the hydraulic circuit to the accumulator. The first one-way valve is disposed downstream of the accumulator for permitting flow from the accumulator to the hydraulic circuit and for preventing flow from the hydraulic circuit to the accumulator without first passing through the control valve. The control valve has an open position that provides communication between the hydraulic circuit and the accumulator for a Miller cycle or Miller-like cycle operation. The control valve also has a closed position that prevents communication between the hydraulic circuit and the accumulator during Otto cycle operation.

20 Claims, 5 Drawing Sheets

(56) References Cited

U.S. PATENT DOCUMENTS

2003/0145810 A1 8/2003 Leman et al.
2013/0000291 A1 1/2013 Nelson et al.
2014/0083087 A1 3/2014 Mount

* cited by examiner

INTAKE VALVE CLOSURE CONTROL FOR DUAL-FUEL ENGINES

BACKGROUND

1. Technical Field

Disclosed herein are methods and apparatuses for controlling the opening and closing of combustion cylinder intake valves of dual-fuel internal combustion engines.

2. Description of the Related Art

Technology that allows diesel engines to run primarily on liquefied natural gas (LNG) may provide an economical way to shift fuel consumption from diesel to LNG. Such a shift could lower greenhouse gas emissions, because burning LNG emits less carbon dioxide per unit of energy than diesel. Shifting from diesel to LNG may save costs, because LNG is cheaper per unit of energy than diesel. Dual-fuel engines, which burn both diesel and LNG, are advantageous because an operator can revert to diesel if LNG is not available or if the price of natural gas rises.

Diesel engines may be converted to run primarily on LNG with relatively small modifications. In a diesel engine, the air-fuel mixture is not ignited with a spark, as in gasoline engines, but by compressing the air until the air-fuel mixture gets hot enough to combust. Compression ignition, as the process is called, does not work well with LNG alone because it is too difficult to control exactly when combustion occurs. As a result, the LNG can detonate and damage the engine. In a dual-fuel engine, this problem is solved by injecting a small amount of diesel into the cylinders with the LNG to trigger combustion. Hence, diesel engines converted to burn LNG also burn small amounts of diesel.

Diesel engines are typically four-stroke engines the operate with a diesel cycle. In an ideal diesel cycle, constant pressure during the combustion is assumed. In contrast, in an "Otto cycle," constant volume during the combustion is assumed. During an Otto cycle, the piston completes four separate strokes to complete a single thermodynamic cycle. A stroke refers to the full travel of the piston along the cylinder, in either direction. The four strokes are (i) intake, (ii) compression, (iii) power and (iv) exhaust. The intake stroke of the piston begins at top of the cylinder with the intake valve(s) open and the exhaust valve(s) closed. The piston descends from the top to the bottom of the cylinder as air is injected into the cylinder. During the compression stroke, both the intake and exhaust valves are closed and the piston returns towards the top of the cylinder, compressing the air. At the beginning of the power stroke, diesel fuel is injected into the cylinder and the piston is close to the top of the cylinder and the compressed hot air ignites the diesel fuel with the heat generated by compressing the air. The resulting pressure from the combustion forces the piston back towards bottom of the cylinder to complete the power stroke. Finally, during the exhaust stroke, the piston once again returns to top of the cylinder while the exhaust valve(s) are open and to expel the spent exhaust gases from the cylinder.

A Miller cycle is a variation of the Otto cycle. During a traditional Miller cycle, the intake valve remains open for part of the compression stroke. In effect, the compression stroke is divided into two discrete portions or stages: the initial portion, when the intake valve(s) remain open and final portion when the intake valve(s) are closed. To counteract the loss of power resulting from the shorter compression stroke and reduced compression ratio, Miller engines are equipped with a supercharger. Pressurized air from the supercharger passes through an intercooler, which lowers the air temperature of the air, making it denser, so more air fits within the same volume during the intake stroke. During a Miller intake stroke, a charge of cold, compressed air rushes into the cylinder with the intake valve(s) open, filling the cylinder with more air than in an Otto cycle intake stroke. As the compression stroke starts with the intake valve(s) open, the output of the supercharger keeps the cylinder pressurized until the intake valve(s) close, thereby limiting the amount of air that is pushed out of the cylinder and into the intake manifold. Further, compressing the air against the pressure from the supercharger requires less energy than compressing the air mixture in a closed cylinder, thereby reducing pumping losses compared to a traditional Otto engine.

The compression ratio of an Otto cycle is higher than that of a Miller cycle because an Otto cycle has a longer effective compression stroke than a Miller cycle. While a high compression ratio is desired for diesel, use of an Otto cycle and a high compression ratio with LNG may result in knocking. A lower effective compression ratio is preferred for LNG than for diesel, which will allow for maximum gas substitution. As a result, an Otto cycle is preferred for diesel and a Miller cycle is preferred for LNG. However, dual-fuel engines need to be able to convert from burning diesel to burning LNG and vice versa. For example, dual-fuel engines may need to switch back to burning diesel if the LNG supply runs out by returning to an Otto cycle or a diesel cycle. Further, it may be easier to start an engine that runs on diesel. To switch between an Otto cycle and a Miller cycle or to change the compression ratio, the timing of the intake valves must be changed. Thus, for dual-fueled engines, the timing of the intake valve closing must be varied to change the compression ratio or to switch between an Otto cycle and a Miller cycle or a variation thereof.

Therefore, there is a need for controlling the closure of the intake valves of an internal combustion engine to enable the engine to run on diesel alone in a diesel cycle or an Otto cycle or to run on diesel in combination with LNG in a Miller or Miller-like cycle.

SUMMARY OF THE DISCLOSURE

In one aspect, an actuation system for an intake valve of an internal combustion engine is disclosed. The system may include a hydraulic circuit that may include a master cylinder, a control valve, an accumulator, a first one-way valve and a slave cylinder. The slave cylinder may accommodate a slave piston and the slave piston may be coupled to the intake valve. The control valve may be disposed upstream of the accumulator for controlling flow from the hydraulic circuit to the accumulator. The first one-way valve may be disposed downstream of the accumulator for permitting flow from the accumulator to the hydraulic circuit and for preventing flow from the hydraulic circuit to the accumulator without passing through the control valve. Further, the control valve may have an open position providing communication between the hydraulic circuit and the accumulator and a closed position for preventing communication between the hydraulic circuit and the accumulator. Optionally, a second one-way valve may be disposed upstream of the hydraulic circuit allowing flow from the fluid supply to the hydraulic circuit and preventing flow back to the fluid supply.

In another aspect, an internal combustion engine is disclosed. The disclosed engine may include a hydraulic circuit that may include a master cylinder, a control valve, an accumulator, a first one-way valve and a slave cylinder. The slave cylinder may accommodate a slave piston. The slave piston may be coupled to an intake valve. The master cylinder may accommodate a master piston and the master piston may engage a rotating cam. The control valve may be disposed upstream of the accumulator and the first one-way valve may be disposed downstream of the accumulator. The control valve may have an open position that may provide communication between the hydraulic circuit and the accumulator. The control valve may also have a closed position that prevents communication between the hydraulic circuit and the accumulator. The first one-way valve may permit flow from the accumulator to the hydraulic circuit; the first one-way valve may also prevent flow from the hydraulic circuit to the accumulator without the flow passing through the control valve. Further, the engine operates as an Otto cycle engine having a first compression ratio when the control valve is closed and the engine operates with a second compression ratio that is less than the first compression ratio when the control valve is open.

In another aspect, a method for changing the compression ratio of a dual-fuel internal combustion engine is disclosed. The disclosed method may include providing a hydraulic circuit that may include a master cylinder, a control valve, an accumulator, a first one-way valve and a slave cylinder. The slave cylinder may accommodate a slave piston and the slave piston may be coupled to the intake valve. The control valve may be disposed upstream of the accumulator for controlling flow from the hydraulic circuit to the accumulator. The first one-way valve may be disposed downstream of the accumulator for permitting flow from the accumulator to the hydraulic circuit and for preventing flow from the hydraulic circuit to the accumulator without the flow passing through the control valve. The method may include closing the control valve to prevent communication between the hydraulic circuit and the accumulator, which results in the engine operating with a first compression ratio. The method may further include opening the control valve to provide communication from the hydraulic circuit to the accumulator and to operate the engine with a second compression ratio that is less than the first compression ratio.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
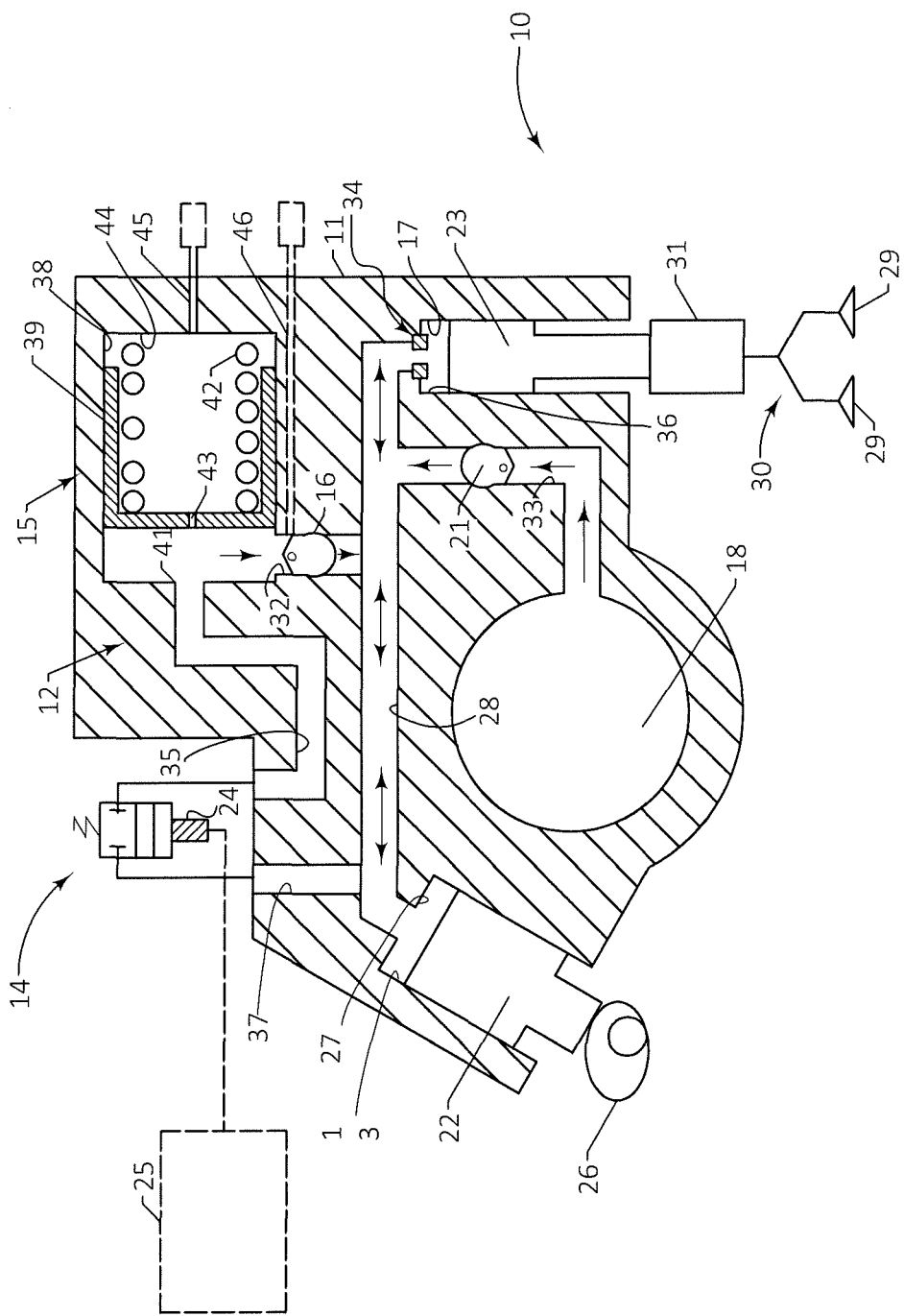
FIG. 1 is a schematic illustration of a disclosed actuation system for an intake valve of an internal combustion engine, wherein the control valve is in its normally closed position thereby isolating the accumulator from the hydraulic circuit and enabling the engine to operate as an Otto cycle engine.
Figure 2:
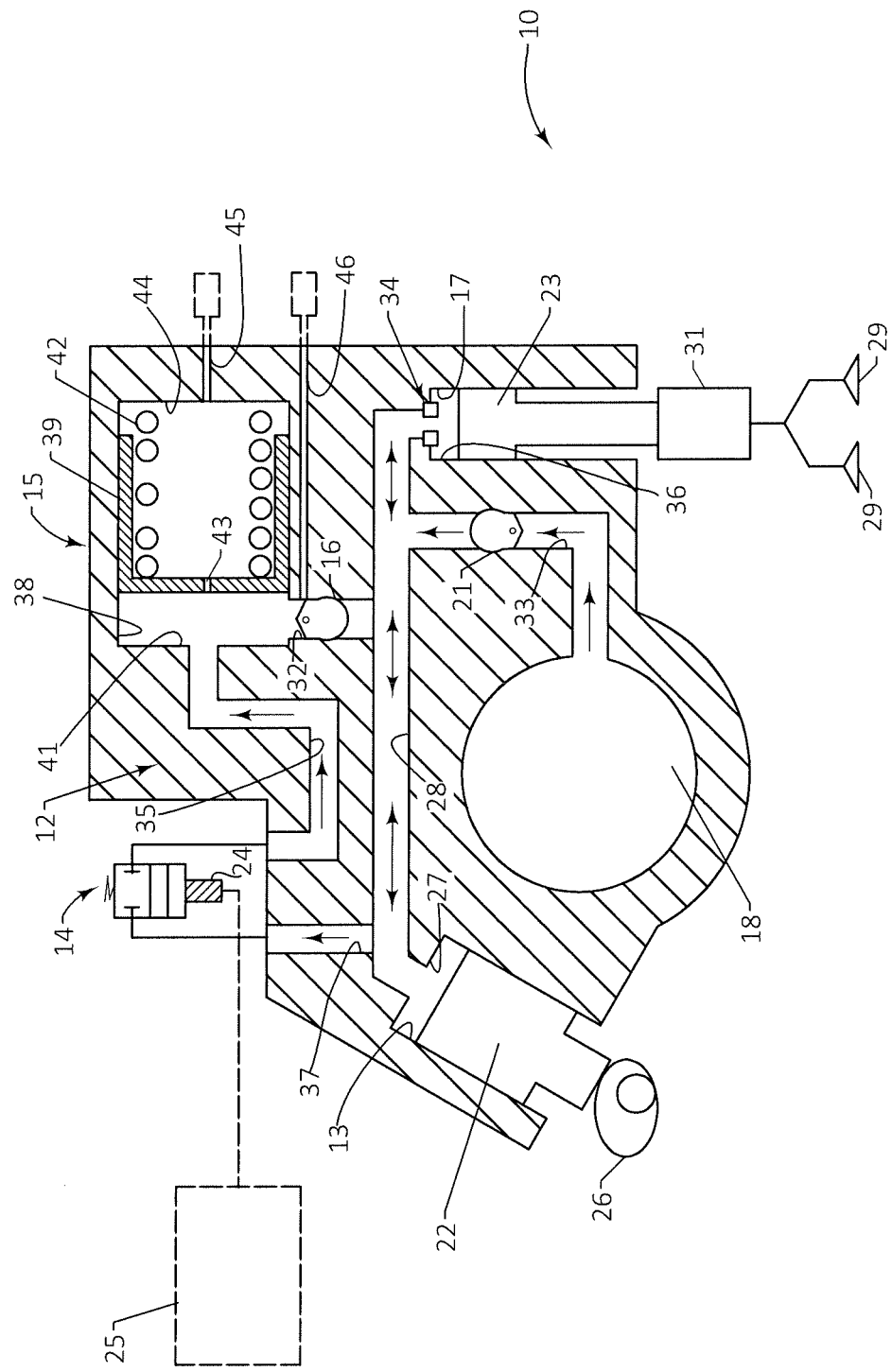
FIG. 2 is a schematic illustration of the actuation system shown in FIG. 1, but with the control valve in an open position, thereby providing communication between the hydraulic circuit and the accumulator, which results in the slave piston and intake valve returning to a closed position towards the end of the intake stroke, which results in a reduced compression ratio compared to when the control valve is in a closed position, as shown in FIG. 1.

FIG. 1 illustrates part of an engine 10 that may include a block 11 or other suitable structure for accommodating the hydraulic circuit 12. The hydraulic circuit 12 may include a master cylinder 13, a control valve 14, an accumulator 15, a first one-way valve 16, a slave cylinder 17, and a fluid supply 18 and a second one-way valve 21. The master cylinder 13 may accommodate a master piston 22. The term master cylinder 13 is intended to cover a cylindrical receiving space for the master piston 22. The master cylinder 13 may be provided in the form of a bore, as shown in FIGS. 1-2, or the master cylinder 13 may be a separate component (not shown). Similarly, the slave cylinder 17 may accommodate a slave piston 23. The slave cylinder 17 may be in the form of a bore, as shown in FIGS. 1-2, or it may be a separate component as illustrated in FIGS. 3-6 and described below.

Returning to FIG. 1, the operation of the hydraulic circuit 12 with the control valve 14 in its normally closed position will be described. At the outset, the control valve 14 may include a solenoid 24 that may be linked to a controller 25 that may be an engine control module or a separate controller. In the embodiment shown in FIGS. 1-2, the control valve 14 is a two position control valve. However, other control valves, such as three position control valves may be used, as will be apparent to those skilled in the art. Further, the control valve 14 may also be a normally-open control valve as opposed to a normally-closed control valve. In short, substitution of different control valves for the normally-closed two position control valve 14 as shown in FIGS. 1-2 will be apparent to those skilled in the art.

The master piston 22 is controlled by a cam lobe 26, which imparts an oscillating motion to the master piston 22. As the master piston 22 moves towards the top 27 of the master cylinder 13, it pumps fluid into the passageway 28, which forces fluid from the passageway 28 into the slave cylinder 17.

The pressure in the slave cylinder 17 forces the slave piston 23 downward. The slave piston 23 connects to one or more intake valves 29 by way of a bridge 30 that may include a hydraulic lash adjustor 31. The first one-way valve 16 prevents fluid in the passageway 28 from migrating to the accumulator 15 by way of the passageway 32. Flow into the accumulator 15 by way of the control valve 14 is discussed below in connection with FIG. 2. Similarly, the second one-way valve 21 prevents fluid in the passageway 28 for migrating to the fluid supply 18 by way of the passageway 33. Fluid passes from the passageway 28 into the slave cylinder 17 by way of the snub plate 34, which will be discussed in greater detail below in connection with FIGS. 3-8.

Still referring to FIG. 1, with the control valve 14 in its normally closed position, the engine 10 operates in accordance with an Otto cycle, with a large compression ratio, which is ideal for diesel fuel. During a valve closing event with the control valve 14 closed (Otto cycle), rotation of the cam lobe 26 will result in movement of the master piston 22 away from the top 27 of the master cylinder 13, which draws fluid from the passageway 28 into the master cylinder 13 and fluid from the slave cylinder 17 into the passageway 28. Again, with the control valve 14 in its closed position, fluid does not migrate into the passageway 35 or into the accumulator 15. Instead, the slave piston 23 moves toward the top 36 of the slave cylinder 17 or towards the snub plate 34 to close the intake valves 29. During a valve opening event, with the control valve 14 in its closed position, the cam lobe 26 will move the master piston 22 towards the top 27 of the master cylinder 13, which pumps fluid into the passageway 28 and fluid from the passageway 28 into the slave cylinder 17. The increased pressure in the slave cylinder 17 drives the slave piston 23 away from the top 36 of the slave cylinder 17, thereby opening the intake valves 29.

To change the operation of the engine 10 from an Otto cycle to a different cycle, such as a Miller cycle or a similar cycle, or to reduce the compression ratio, the control valve 14 may be shifted by the controller 25 to its open position as shown in FIG. 2. Turning to FIG. 2, to operate the engine 10 on LNG and a small amount of diesel, the compression ratio of the engine 10 may be reduced, which allows for greater gas substitution. In accordance with one aspect of this disclosure, one means for reducing the compression ratio of the engine 10 is to reduce the effective intake stroke and compression stroke of the engine 10 by closing the intake valves 29 before the end of the intake stroke and maintaining the intake valves in a closed position through the compression stroke. This will be explained below in connection with FIGS. 2 and 8.

In FIG. 2, during a middle portion of the intake stroke, the controller 25 has sent a signal to the solenoid 24 to open the control valve 14. The piston 22 moves towards the top 27 of the master cylinder 13, which results in fluid moving from the master cylinder into the passageway 28 as well as into the passageway 37, which leads to the control valve 14. As fluid builds pressure in the slave cylinder 17, the slave piston 23 and intake valves 29 are forced downward. When it is desirable to close the intake valves 29, the controller 25 sends a signal opening the control valve 14. The fluid then leaves the slave cylinder 17 and passes through the control valve 14 to the cylinder 38 of the accumulator 15 to close the intake valves 29 earlier. The accumulator 15 may be pressurized, as it may include a piston 39 that is biased towards a top 41 of the cylinder 38 by a biasing element 42. Thus, fluid may also proceed from the master cylinder 13 through the passageway 28 to the slave cylinder 17. Pressure in the slave cylinder 17 causes the slave piston 23 to move away from the top 36 of the slave cylinder 17 thereby causing the intake valves 29 to open during the beginning of an intake stroke. Despite the presence of the accumulator 15 and the open position of the control valve 14, the beginning of the intake stroke during the thermodynamic cycle illustrated in FIG. 2 is about the same as the beginning of the intake stroke for the Otto cycle illustrated in FIG. 1. However, there is a distinct difference between the ends of intake strokes of the Otto cycle of FIG. 1 and the thermodynamic cycle of FIG. 2.

During the first half of the intake stroke, the master piston 22 moves towards the top 27 of the master cylinder 13. During the second half of the intake stroke, the master piston 22 moves away from the top 27 of the master cylinder 13 and fluid is pumped from the slave cylinder 17, into the passageway 37, through the control valve 14, through the passageway 35 and into the accumulator 15. Because there is less pressure in the accumulator 15 than the slave cylinder 17, fluid flows from the slave cylinder 17 into the passageway 28 and from the passageway 28 into the passageway 37 and towards the accumulator 15. As a result, fluid is evacuated from the slave cylinder 17 before the end of the intake stroke. By providing the additional available volume of the accumulator cylinder 38, fluid will be drawn out of the slave cylinder 17 and through the snub plate 34 before the end of the intake stroke. Thus, having the control valve 14 in an open position along with the additional volume provided by the accumulator cylinder 38, fluid in the slave cylinder 17 will be evacuated sooner and the slave piston 23 will move towards the top 36 of the slave cylinder 17 sooner thereby resulting in an early closure of the intake valves 29 before the end of the intake stroke.

To bleed out any air or debris trapped in the system, the accumulator piston 39 may be equipped with a bleed orifice 43 and the closed distal end 44 of the accumulator cylinder 38 may be similarly equipped with a bleed orifice 45. Thus, if pressure in the hydraulic circuit 12 reaches a predetermined threshold, fluid may migrate through the bleed orifice 43 to reduce the pressure in the accumulator cylinder and any back pressure may also be bled through the orifice 45. Similarly, instead of providing a bleed orifice 43 in the accumulator piston 39 and an additional bleed orifice 45 through the closed distal end 44 of the accumulator cylinder, a bleed orifice 46 may be provided in a passageway, such as the passageway 32 as shown in FIGS. 1 and 2.

Figure 4:
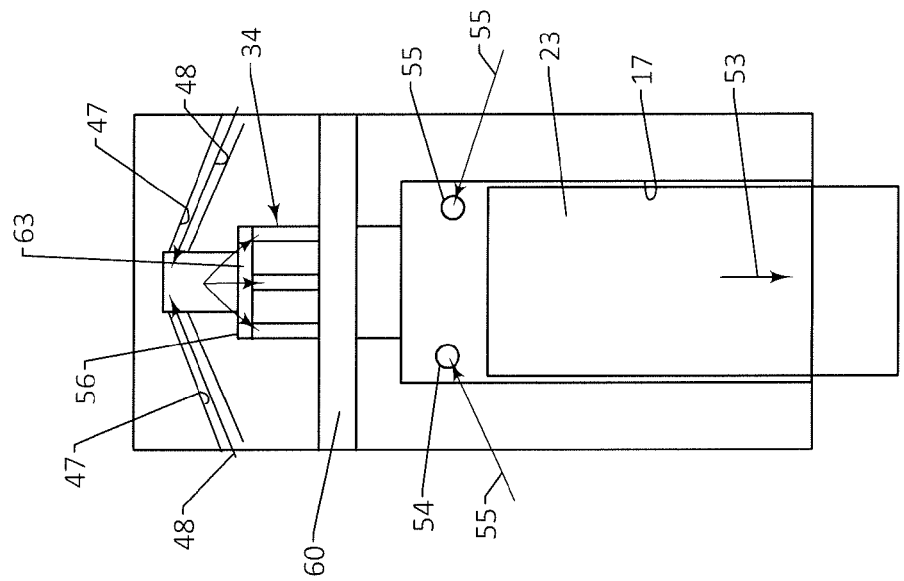
FIG. 4 is a schematic and sectional view of the slave cylinder, slave piston and snub plate shown in FIG. 4, but further illustrating the flow through the staggered radial feed holes in the slave cylinder after the piston unblocks the radial feed holes.
Figure 3:
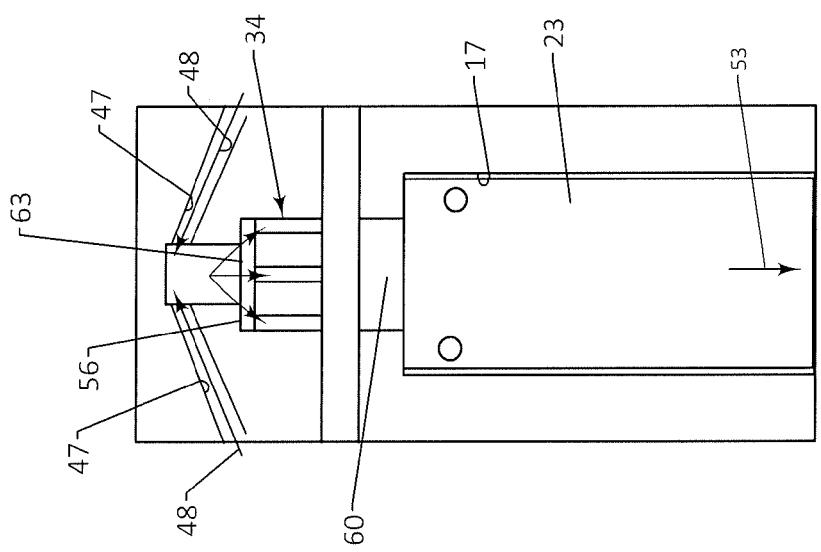
FIG. 3 is a schematic and sectional view of the slave cylinder, slave piston and snub plate at the beginning of an intake valve-opening event, such as an intake stroke.
Figure 6:
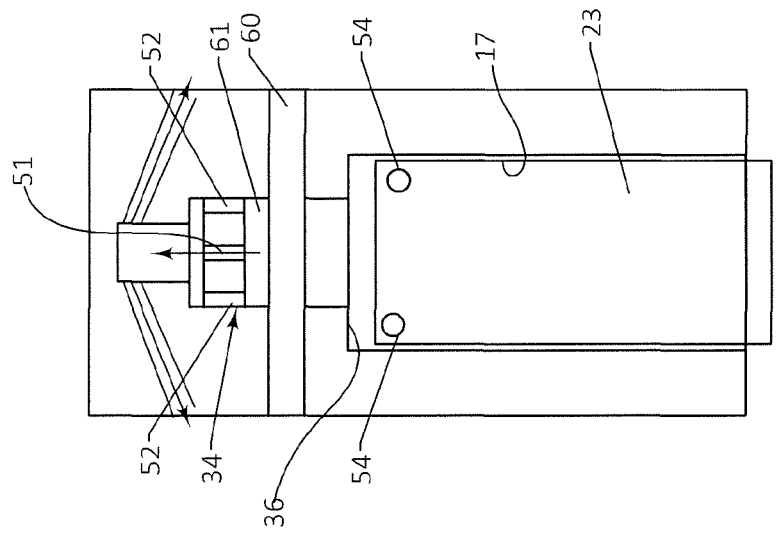
FIG. 6 is another schematic and sectional view of the slave cylinder, slave piston and snub plate as the snub plate attenuates flow by permitting fluid to flow only through the center hole in the snub plate when the snub plate is in its seated position.
Figure 7:
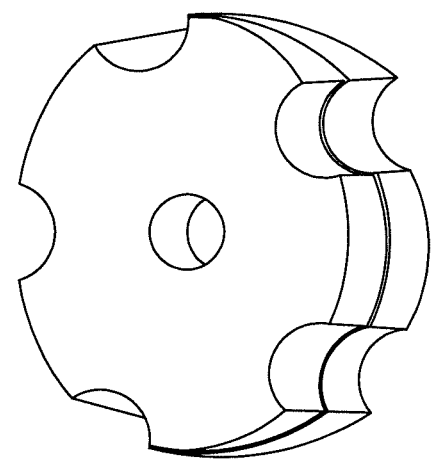
FIG. 7 is a perspective view of the snub plate shown in FIGS. 3-6.

The operation of the slave piston 23, slave cylinder 17 and the snub plate 34 will now be discussed in connection with FIGS. 3-6. Turning to FIG. 3, the slave piston 23 is shown at the beginning of a stroke, such as an intake stroke. Fluid is forced into the slave cylinder 17 through the top feed holes 47 as indicated by the arrows 48. Fluid is communicated past the snub plate 34, which as shown in FIG. 7, includes a center hole 51 and peripheral slots 52 or holes (not shown). Pressurized fluid then forces the slave piston 23 in the direction of the arrow 53, thereby marking the beginning of a valve-opening event, such as an intake stroke. Turning to FIG. 4, as the piston continues to move in the direction of the arrow 53, additional fluid is drawn into the slave cylinder 17 through the radial feed holes 54, as indicated by the arrows 55. The radial feed holes 54 may be staggered as shown in FIGS. 3-4 so that they are not simultaneously uncovered or covered by the slave piston 23. Instead, staggering the positions of the radial feed holes 54 avoids pressure spikes associated with fluid rushing into or out of the slave cylinder 17 through all of the radial feed holes 54 at once.

Also shown in FIGS. 3-4 is the position of the snub plate 34 during a valve opening event, such as an intake stroke. Specifically, the snub plate 34 may rest upon a retaining pin 60 or a retaining ring (not shown). By resting on the retaining pin 60, the snub plate 34 moves away from the cavity wall 56, which, as shown below in connection with FIGS. 5-6, blocks flow through the peripheral slots 52. The retaining pin 60 retains the snub plate 34 in the cavity 63 during valve opening events. During valve closing events, the snub plate 34 is biased against the cavity wall 56, which blocks flow through the peripheral slots 52. Blocking flow through the slots 52 attenuates the flow through the snub plate 34 during valve closing events.

Figure 5:
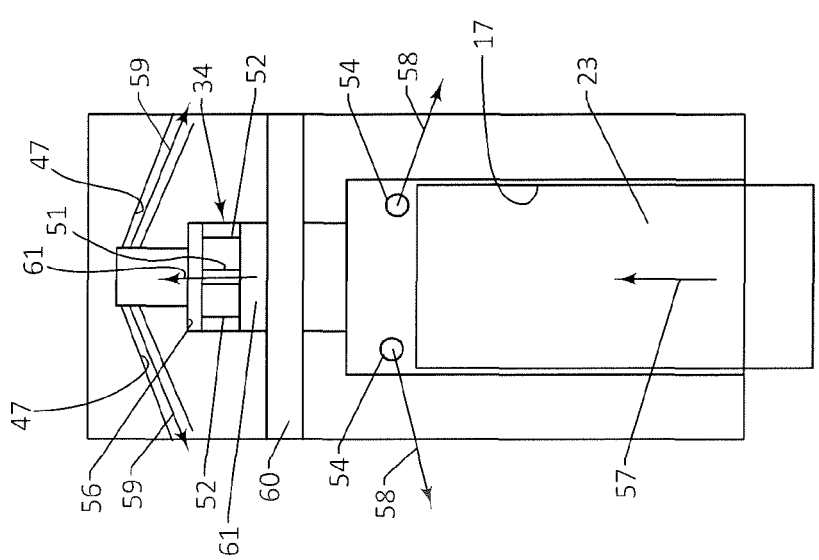
FIG. 5 is a schematic and sectional view of the slave cylinder, slave piston and snub plate shown in FIGS. 3-4, but at the beginning of a valve closing event as the slave piston moves upward in the slave cylinder towards a seated position with most of the flow exiting the slave cylinder through the radial feed holes.

Turning to FIG. 5, the slave piston 23 is shown as it approaches a valve closing event. The slave piston 23 moves in the direction of the arrow 57, or towards the top 36 of the slave cylinder 17. As the slave piston 23 moves in the direction of the arrow 57, fluid is expelled from the slave cylinder 17 through the radial feed holes 54 as indicated by the arrows 58 and out through the top feed holes 47 as indicated by the arrows 59. Further, the snub plate 34 has been shifted upwards against the cavity wall 56, which blocks flow through the peripheral slots 52 of the snub plate 34. Thus, during a valve closing event, flow out of the slave cylinder 17 is attenuated by the snub plate 34 because fluid may flow only through the center hole 51 of the snub plate 34 as indicated by the arrow 61. Flow through the peripheral slots 52 of the snub plate 34 is blocked by the cavity wall 56 when the snub plate 34 is in its seated position as shown in FIGS. 5 and 6. Thus, when the slave piston 23 approaches the top 36 of the slave cylinder 17 and covers the radial feed holes 54 (see FIG. 6), the only exit route for fluid remaining in the slave cylinder 17 is through the center hole 51 of the snub plate 34. Hence, the movement of the slave piston 23 towards the top 36 of the slave cylinder 17 is attenuated or slowed just before the valves close, which reduces wear and tear on the intake valves 29 (FIGS. 1 and 2).

Figure 8:
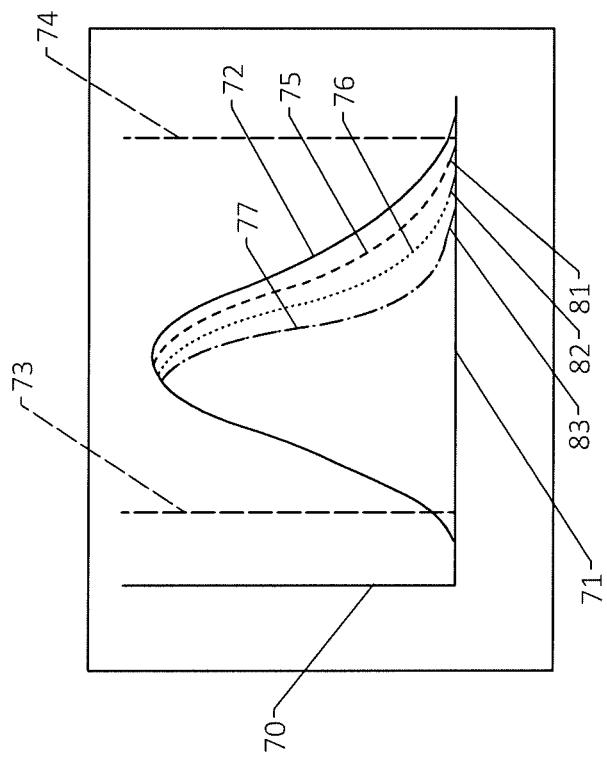
FIG. 8 illustrates, graphically, the valve position during an intake stroke of an Otto cycle engine and during three alternative cycles wherein the intake valves are closed before the end of the intake stroke, thereby providing reduced compression ratios.

FIG. 8 graphically illustrates the attenuation provided by the snub plate 34. The y-axis 70 represents valve lift and the x-axis 71 represents crank angle. The solid line 72 represents the intake stroke of an Otto cycle. Specifically, the line 72 represents the opening and closing of the intake valves 29 from the beginning of the intake stroke as represented by the phantom line 73 (valve lift=0) through the end of the intake stroke as represented by the phantom line 74 (valve lift=0). Thus, in an Otto cycle, as represented by the line 72 in FIG. 8, the valves 29 open at the beginning of the intake stroke and remain open until the end of the intake stroke.

The three lines 75, 76, 77 of FIG. 8 represent Miller or Miller-like thermodynamic cycles. As illustrated in FIG. 8, the intake valves 29 close earlier for the cycle represented by the line 75 than the Otto cycle represented by the line 72. Further, the cycles represented by the lines 76 and 77 close the intake valves 29 even earlier than the cycle represented by the line 75. Because the intake valves 29 close before the intake stroke is completed, and because the intake valves 29 remain closed through the compression stroke, the compression ratio for the cycle represented by the line 77 is the smallest of the four cycles shown in FIG. 8 while the compression ratio for the Otto cycle represented by the line 72 is the largest.

Further, damage to the intake valves 29 may be avoided by the use of the snub plate 34, which slows the valve closing and slightly prolongs the valve closing as indicated by the flattened portions 81, 82, 83 of the lines 75, 76, 77 respectively. Thus, despite the earlier valve closings, the snub plate 34 attenuates flow out of the slave cylinder 17 so that valve closing events do not damage the intake valves 29.

Accordingly, an engine 10 may be converted to run on a maximum amount of LNG by installing the hydraulic circuit 12 as shown in FIGS. 1 and 2 and operating the control valve 14 in accordance the principles discussed above.

INDUSTRIAL APPLICABILITY

A hydraulic circuit 12 that may be easily added to a conventional diesel engine 10 is disclosed which enables the engine 10 to be converted from a diesel cycle, an Otto cycle or a diesel-burning engine 10 to a Miller or Miller-like cycle for maximum LNG substitution. The hydraulic circuit 12 includes a control valve 14 that, when closed, enables the engine 10 to operate as an Otto cycle engine. When open, the control valve 14 provides communication to an accumulator 15, which assists in evacuating the slave cylinder 17 as the slave piston 23 reaches the top 36 of the slave cylinder 17. This action results in an early closing of the intake valves 29, during a final portion of the intake stroke. The intake valves 29 remain closed through the compression stroke. Because the intake stroke is shortened, the effective compression stroke is also shortened, thereby reducing the compression ratio of the engine 10. Reducing the compression ratio of the engine 10 permits maximum LNG substitution. Actuation of the control valve 14 may be performed by a controller 25, which may be a separate, stand-alone controller or a function of the engine control unit.

A disclosed method for changing the compression ratio of a dual-fuel internal combustion engine may include providing the hydraulic circuit 12 as described above. The method may further include closing the control valve 14 to prevent communication between the hydraulic circuit and the accumulator 15 to thereby operate the engine 10 with a first compression ratio. The method may further include opening the control valve 14 to provide communication between the hydraulic circuit 12 and the accumulator 15 and to operate the engine 10 with a second compression ratio that is less than the first compression ratio.

While only certain embodiments of been set forth, alternative embodiments and various modifications will be apparent from the above description to those skilled in the art. These and other alternatives are considered equivalents and within the spirit and scope of the present disclosure.

What is claimed:

1. An actuation system for a valve of an internal combustion engine, the system comprising:
    a hydraulic circuit including
        a master cylinder and a slave cylinder, the slave cylinder accommodating a slave piston,
        a first passageway in fluid communication with the master cylinder and the slave cylinder,
        a control valve configured to direct fluid flow between the master cylinder and an accumulator by way of a second passageway in fluid communication with the first passageway and the control valve, and a third passageway, isolated from the first passageway and in fluid communication with the control valve and the accumulator,
        a first one way valve positioned in a fourth passageway, the fourth passageway in fluid communication with the accumulator and the first passageway and configured to permit fluid flow only in a direction from the accumulator to the first passageway;
    wherein the slave piston is coupled to an intake valve and
    wherein the control valve is configured to have an open position providing fluid communication between the master cylinder and the accumulator and a closed position preventing fluid communication between the master cylinder and the accumulator.

2. The actuation system of claim 1 wherein the control valve is a normally closed control valve.

3. The actuation system of claim 1 wherein the control valve is a normally closed control valve that is linked to a controller, the controller configured to send signals to move the control valve between the open and closed positions.

4. The actuation system of claim 1 wherein the engine operates as an Otto cycle engine having a first compression ratio when the control valve is closed.

5. The actuation system of claim 4 wherein the engine operates with a second compression ratio that is less than the first compression ratio when the control valve is open.

6. The actuation system of claim 1 wherein the first one-way valve is a check valve.

7. The actuation system of claim 1 wherein the hydraulic circuit further includes a fluid supply and a second one-way valve positioned in a fifth passageway, the second one way valve being configured to permit fluid flow only in a direction from the fluid supply to the first passageway.

8. The actuation system of claim 1 wherein the slave cylinder accommodates a snub plate that attenuates flow from the slave cylinder to the hydraulic circuit.

9. The actuation system of claim 1 wherein when the control valve is in the open position, fluid flows from the master cylinder to the slave cylinder thereby enabling the slave piston to actuate the intake valve.

10. The actuation system of claim 1 further including a hydraulic lash adjuster disposed between the slave piston and the intake valve.

11. The actuation system of claim 1 wherein the slave piston is coupled to a plurality of intake valves.

12. The actuation system of claim 1 wherein the accumulator includes an accumulator cylinder having a closed distal end and an open end that is in fluid communication with the first passageway and the fourth passageway, the accumulator further including an accumulator piston slidably received in the accumulator cylinder and a biasing element disposed between the piston and the closed end of the accumulator cylinder for biasing the accumulator piston towards the open end,
the accumulator piston including a first bleed orifice that provides communication between the open end and the closed end of the accumulator cylinder, the closed end of the accumulator cylinder including a second bleed orifice that provides communication between the closed end of the accumulator cylinder and a reservoir.

13. An internal combustion engine, comprising:
a hydraulic circuit including
a master cylinder, the master cylinder accommodating a master piston, and a slave cylinder, the slave cylinder accommodating a slave piston, wherein the master piston engages a rotating cam synchronized with the engine and wherein the slave piston is coupled to an intake valve,
a first passageway in fluid communication with the master cylinder and the slave cylinder,
a control valve configured to direct fluid flow between the master cylinder and an accumulator by way of a second passageway in fluid communication with the first passageway and the control valve, and a third passageway, isolated from the first passageway and in fluid communication with the control valve and the accumulator,
a first one-way valve positioned in a fourth passageway, the fourth passageway in fluid communication with the accumulator and the first passageway, the first one way valve configured to permit fluid flow only in a direction from the accumulator to the first passageway;
wherein the control valve is configured to have an open position providing fluid communication between the master cylinder and the accumulator and a closed position preventing fluid communication between the master cylinder and the accumulator; and
wherein the engine operates as an Otto cycle engine with a first compression ratio when the control valve is closed and wherein the engine operates with a second effective compression ratio that is less than the first compression ratio when the control valve is open.

14. The engine of claim 13 wherein the control valve is a normally closed control valve.

15. The engine of claim 13 wherein the control valve is a normally closed control valve that is linked to a controller, the controller programmed to send signals to move the control valve between the open and closed positions.

16. The engine of claim 13 wherein the first one-way valve is a check valve.

17. The engine of claim 13 wherein the hydraulic circuit further includes a fluid supply and a second one-way valve positioned in a fifth passageway, the second one way valve being configured to permit fluid flow only in a direction from the fluid supply to the first passageway.

18. The engine of claim 17 wherein the second one-way valve is a check valve.

19. The engine of claim 13 wherein the slave cylinder accommodates a snub plate that attenuates flow from the slave cylinder to the first passageway.

20. A method for changing the compression ratio of a dual-fuel internal combustion engine that includes a valve actuator having a hydraulic circuit including a master cylinder and a slave cylinder, the slave cylinder accommodating a slave piston, a first passageway in fluid communication with the master cylinder and the slave cylinder, a control valve configured to direct fluid flow between the master cylinder and an accumulator by way of a second passageway in fluid communication with the first passageway and the control valve, and a third passageway, isolated from the first passageway and in fluid communication with the control valve and the accumulator, a first one way valve positioned in a fourth passageway, the fourth passageway in fluid communication with the accumulator and the first passageway and configured to permit fluid flow only in a direction from the accumulator to the first passageway; wherein the slave piston is coupled to an intake valve and wherein the control valve is configured to have an open position providing fluid communication between the master cylinder and the accumulator and a closed position preventing fluid communication between the master cylinder and the accumulator, the method comprising:
closing the control valve to prevent communication between the first passageway and the accumulator and to operate the engine with a first compression ratio; and
opening the control valve to provide communication from the first passageway to the accumulator and to operate the engine with a second effective compression ratio that is less than the first compression ratio.

\* \* \* \* \*